UNITED STATES PATENT OFFICE.

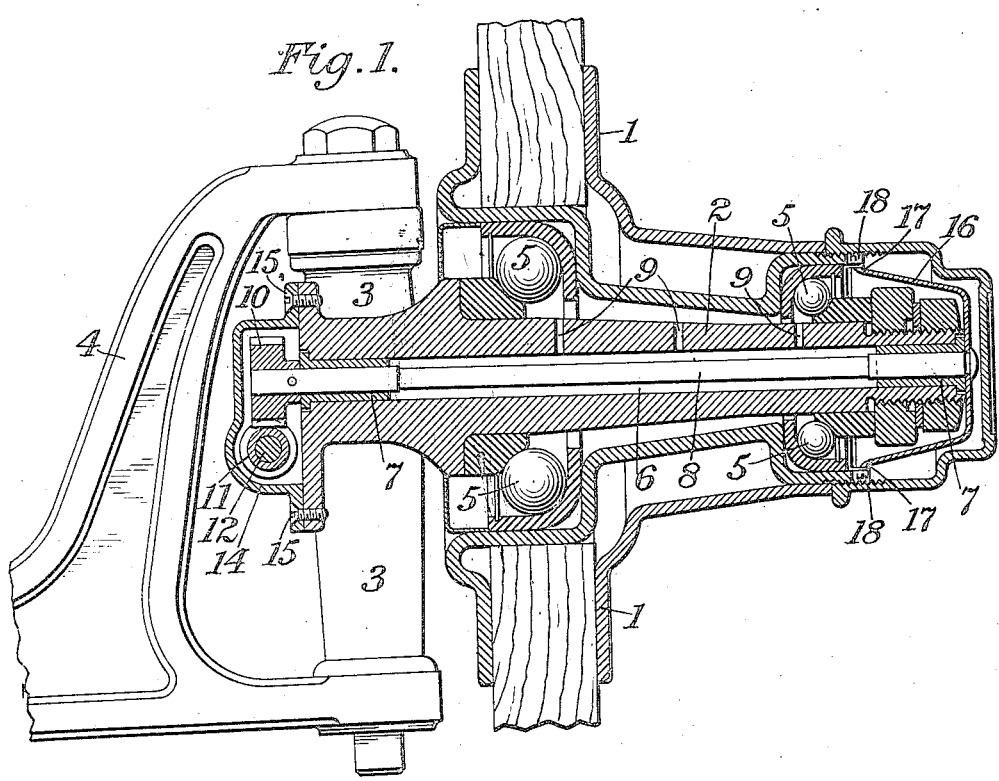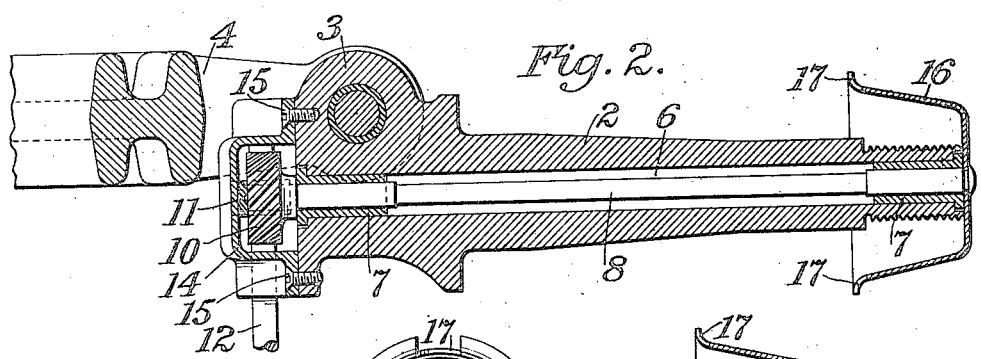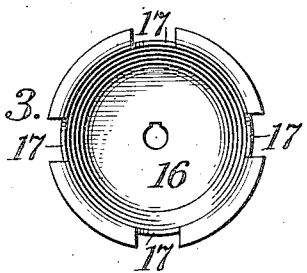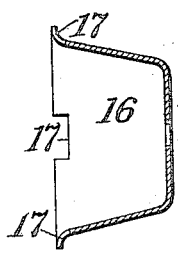

JOHN G. PERRIN, OF DETROIT, MICHIGAN, ASSIGNOR TO MOTOR PATENTS COMPANY, OF DETROIT, MICHIGAN, A CORPORATION OF MICHIGAN.

MECHANISM FOR DRIVING SPEEDOMETERS.

1,223,902.  Specification of Letters Patent.  Patented Apr. 24, 1917.

Application filed August 1, 1911. Serial No. 641,875.

*To all whom it may concern:*

Be it known that I, JOHN G. PERRIN, a citizen of the United States, residing at Detroit, in the county of Wayne and State of Michigan, have invented certain new and useful Improvements in Mechanism for Driving Speedometers, of which the following is a specification.

The primary object of this invention is to provide a speedometer drive which shall avoid the use of exposed gearing or pinions of any kind, in which the driving mechanism shall be entirely inclosed and protected from accidental injury.

Heretofore it has been usual to secure a gear or driving pinion to the hub of the wheel which engaged with a train of gears and actuated the speedometer, but such gear was exposed and subject to injury or clogging so that great difficulty has been experienced in obtaining an accurate speed record. It has also been customary, in case demountable wheels were used, to drive the speedometer from the driving shaft or from some part of the transmission, but such construction is objectionable because of the difficulty of obtaining access to the parts forming the speedometer drive, and particularly the difficulty in securing the same in place without interference with other parts of the mechanism and properly protecting same from injury.

This invention is not only designed to avoid the foregoing objections, but a further object of the invention is to provide a drive which can be used in connection with a wheel having either demountable rims, or in which the wheel as a whole is demountable.

A further object of the invention is to provide a construction which shall be relatively noiseless, and which may be suitably lubricated so as to keep the parts in proper working condition.

The various other objects of the invention will be more fully set forth in the following description of one form of mechanism embodying my invention, which consists in the new and novel features of construction and combinations of parts hereinafter set forth and claimed.

In the accompanying drawings:—

Figure 1 is a central vertical section of a vehicle axle and portion of a wheel provided with my improved driving mechanism.

Fig. 2 is a sectional plan view of the driving mechanism showing the relative position of the knuckle and the spindle.

Figs. 3 and 4 are detail views showing one form of coupling between the wheel hub and the driving shaft.

Referring to the accompanying drawings showing one form of mechanism embodying my invention, the wheel 1 may be of any desired construction and is mounted upon the spindle 2 of the axle, which is preferably formed integral with the knuckle 3 supported by the yoke 4 in the usual manner. Suitable anti-friction bearings 5 are provided between the wheel and the spindle.

The spindle is preferably offset from the knuckle as shown in Fig. 2 and is provided with a central passage or bore 6 extending therethrough and provided at or near each end with bearing sleeves or bushings 7. A shaft 8 is mounted in said bore and is rotatable on the bearings provided by said bushings. Small openings 9 are provided through the spindle communicating with the central bore, and providing means for lubricating the shaft bearings. At one end said shaft is provided with a spiral gear 10 which meshes with a spiral gear 11 provided on the end of a shaft 12 operatively connected with the speedometer (not shown). It is obvious, however, that any preferred form of driving connection between the driving shaft and the speedometer shaft may be provided as desired.

The driving connection between the driving shaft and the speedometer shaft is inclosed in a suitable casing 14 so as to prevent dust from obtaining access thereto and to permit proper lubrication. Said casing may be secured to the knuckle in any suitable manner; preferably a facing or shoulder is formed on the knuckle, and the casing is secured thereto by screws 15.

At its front or free end a coupling is secured to the end of the shaft 8 which may be connected to the hub of the wheel in any suitable manner. Preferably said coupling comprises a plate 16 which is secured to the end of the shaft. Said coupling is provided with an upwardly and rearwardly projecting flange having slots or recesses which are engaged by arms or extensions 18 provided on the end of the hub. It will be obvious that any rotary movement of the wheel hub will be communicated through the shaft 8 and the spiral gears 10 and 11 to the speedometer.

By means of this construction the driving mechanism is entirely inclosed, so that it is protected from injury and at the same time it does not interfere with the other parts of the mechanism. A much more accurate record can be obtained than when the gears which drive the speedometer are exposed and the gear teeth can become clogged with mud and are subject to corrosion and to injury. The mechanism is compact in coninstruction and may be easily assembled and is readily accessible for repairs. Also the wheel centers may be placed nearer the axle pivot than is now possible because of the necessity of spreading said centers to provide room for the installation of the speedometer drive gear.

Although I have shown one form of mechanism embodying my invention, it is obvious that many changes within the skill of the mechanic may be made in the details of the construction herein shown and described without departing from the spirit of the invention provided the means set forth in the following claims be employed.

I claim as my invention:—

1. In a motor vehicle, the combination with a stationary axle, a steering spindle pivoted at the end of said axle with its axis in off set relation to its pivot, and a wheel rotatably mounted on said spindle, of an indicator driving mechanism comprising a shaft arranged in said spindle, gears at the inner end of said shaft, and a driving connection between said shaft and said wheel at the outer end of said spindle.

2. In a motor vehicle, the combination of a stationary axle, a steering wheel spindle pivotally connected with said axle, and having its axis off set rearwardly thereof, a wheel rotatably mounted on said spindle, a shaft extending longitudinally through said spindle, and a driving connection between the wheel and said shaft.

3. In a motor vehicle, the combination of an axle, a steering wheel spindle pivotally connected with said axle and having its axis off set relative thereto longitudinally of the vehicle, a wheel rotatably mounted on said spindle, an axially arranged shaft supported in bearings in said spindle, and a driving connection between the wheel and said shaft at the outer end of the spindle.

4. In a vehicle, the combination with the axle, the steering spindle, and the wheel mounted on the spindle, of an indicator driving mechanism comprising an axially arranged shaft extending through said spindle, a vertical pivot connecting said spindle to said axle and arranged wholly at one side of the axis of the spindle, and a driving connection between the wheel and said shaft.

5. In a vehicle, the combination with the axle and the steering spindle, of an indicator driving mechanism including a shaft extending axially through the spindle and a pivotal connection for said spindle to said axle having its axis offset from the axis of said shaft.

This specification signed and witnessed this 21 day of July, A. D., 1911.

JOHN G. PERRIN.

Signed in the presence of—
HELEN M. DAMES,
AMBROSE L. O'SHEA.

Copies of this patent may be obtained for five cents each, by addressing the "Commissioner of Patents, Washington, D. C."